T. R. Timby.

Hoe.

No. 21,562.

Reissued Apr. 16, 1867.

Witnesses.
Theo Frisch.
J. A. Service.

Inventor.
Theo. R. Timby
Per Munn & Co
Attys

N. PETERS, PHOTO-LITHOGRAPHER, WASHINGTON, D. C.

UNITED STATES PATENT OFFICE.

THEODORE R. TIMBY, OF SARATOGA SPRINGS, NEW YORK.

HOE.

Specification forming part of Letters Patent No. 62,574, dated March 5, 1867; Reissue No. 2,562, dated April 16, 1867.

DIVISION A.

*To all whom it may concern:*

Be it known that I, THEODORE R. TIMBY, of Saratoga Springs and the county of Saratoga, in the State of New York, have invented a new and useful Improvement in Hoes; and I hereby declare the following to be a full, exact, and clear description of the same, reference being had to the accompanying drawings, making part of this specification, in which similar letters indicate corresponding parts.

Figure 1:
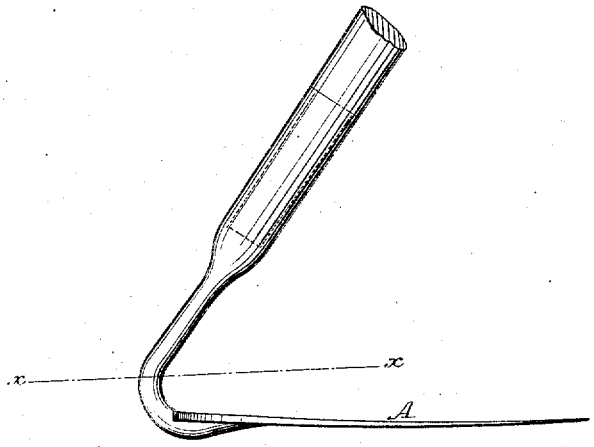
Figure 2:
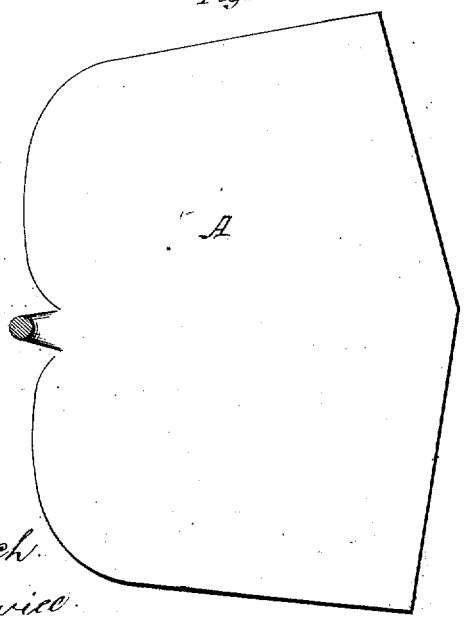

Figure 1 is a side elevation. Fig. 2 is a horizontal section on the plane *x x*, Fig. 1.

This hoe is constructed with an angular cutting-edge, which facilitates its entrance into the ground.

A is the blade of the hoe, the cutting-edge of which is angular, as seen in Fig. 2. The middle of the edge being advanced beyond the corners, it gradually enters the ground, opening the same from the center toward the sides of the hoe with great ease and facility. This arrangement gives the edge a draw-cut, which enables it to work much more easily than hoes of an ordinary construction, and to cut through weeds and grass without difficulty.

Having described my invention, what I claim as new, and desire to secure by Letters Patent, is—

The hoe, with its peculiar angular edge, as described.

THEODORE R. TIMBY.

Witnesses:

JOHN T. CARR,

L. S. NOYES.